Feb. 28, 1933.　　　T. D. HOWE　　　1,899,805
METHOD OF AND APPARATUS FOR USE IN CUTTING LEATHER
Filed Nov. 4, 1931　　　7 Sheets-Sheet 1

Inventor,
Thorndike D. Howe,
by Roberts Cushman & Woodbury
Attys.

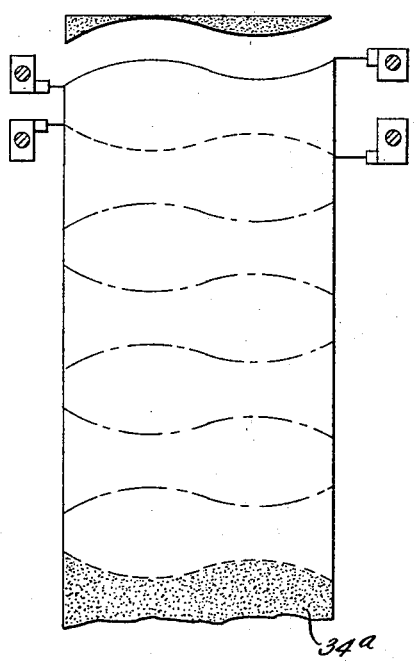
Fig. 12.
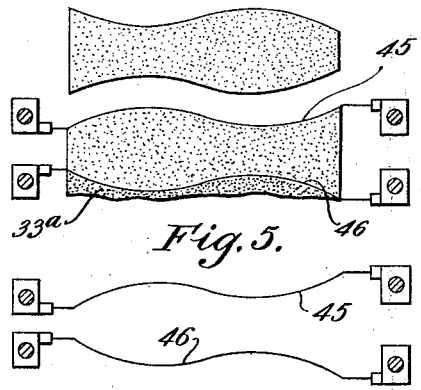
Fig. 6.
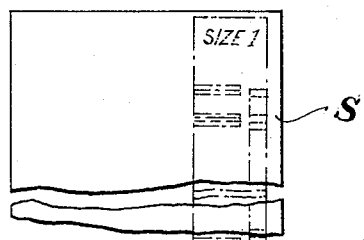
Fig. 5.
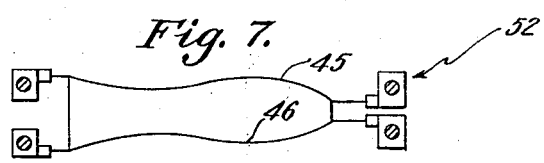
Fig. 7.
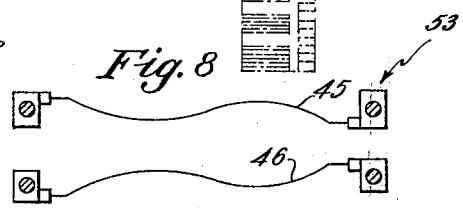
Fig. 8.
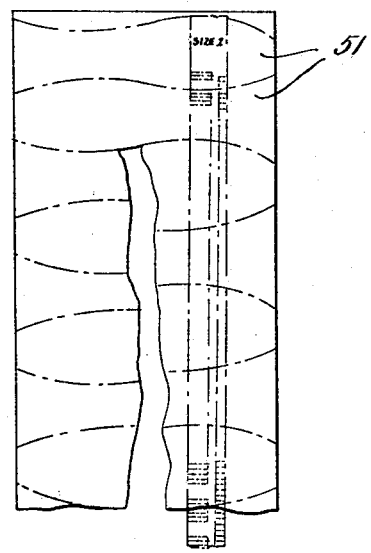
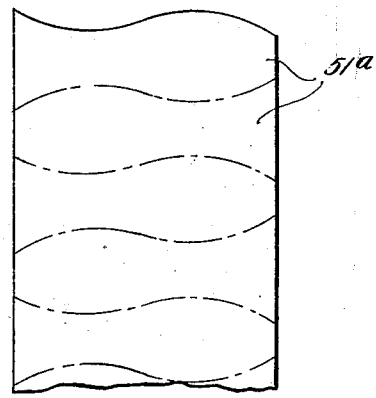
Inventor,
Thorndike D. Howe,
by Roberts, Cushman & Woodberry
Att'ys.

Feb. 28, 1933.  T. D. HOWE  1,899,805
METHOD OF AND APPARATUS FOR USE IN CUTTING LEATHER
Filed Nov. 4, 1931   7 Sheets-Sheet 3
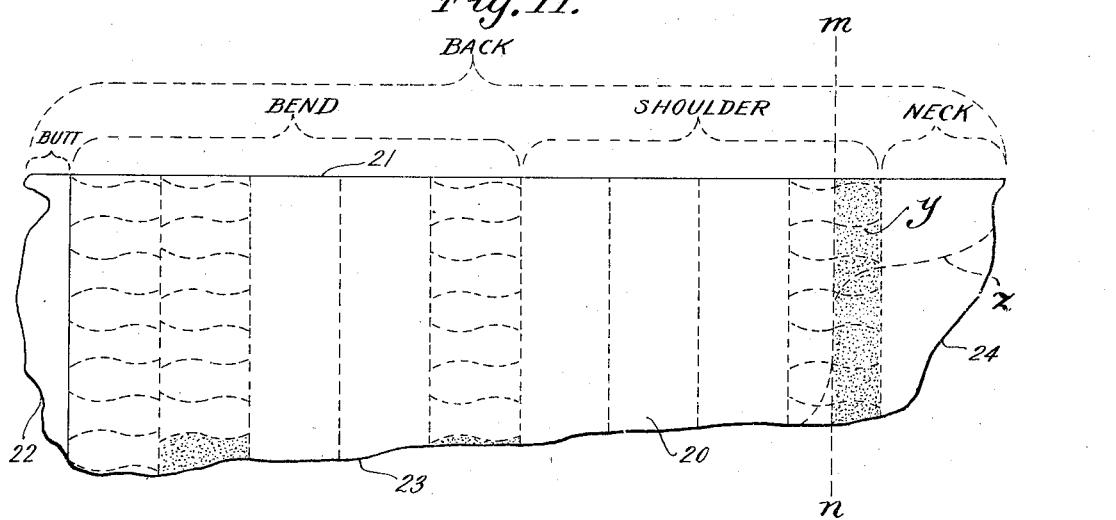
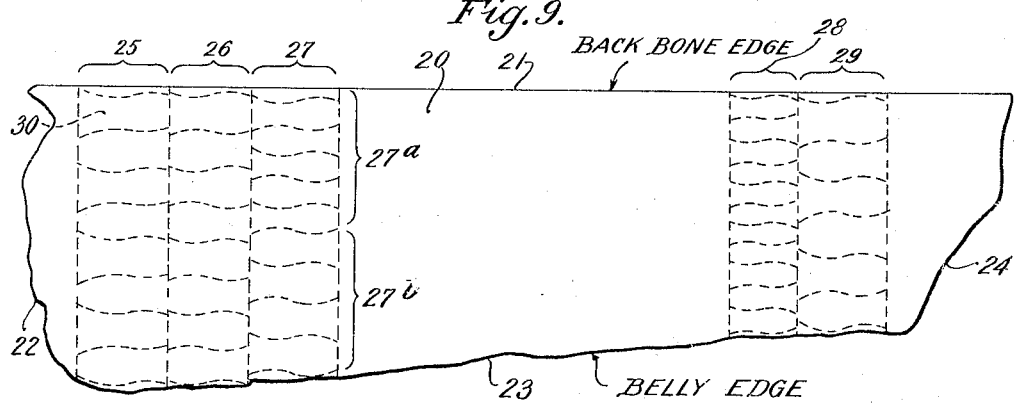
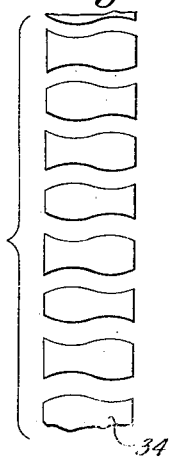
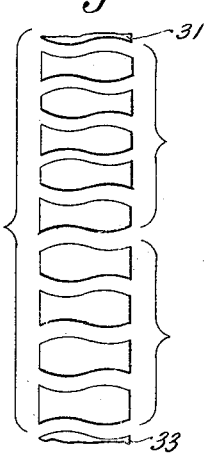
Inventor,
Thorndike D. Howe,
by Roberts, Cushman & Woodberry
Attys.

Feb. 28, 1933.   T. D. HOWE   1,899,805
METHOD OF AND APPARATUS FOR USE IN CUTTING LEATHER
Filed Nov. 4, 1931   7 Sheets-Sheet 4

Inventor,
Thorndike D. Howe,
by Roberts Cushman Woodbury
Attys.

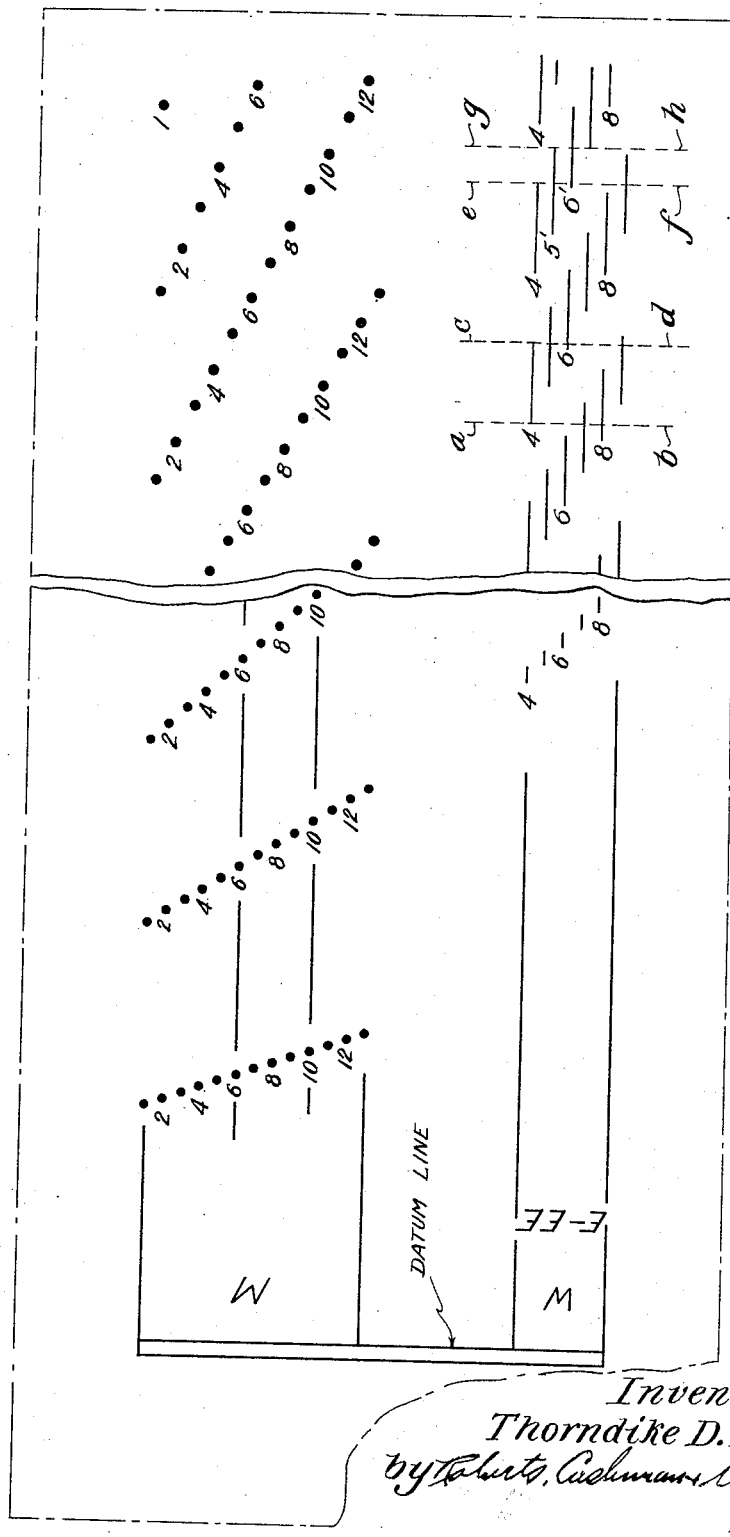

Patented Feb. 28, 1933

1,899,805

UNITED STATES PATENT OFFICE

THORNDIKE D. HOWE, OF BOSTON, MASSACHUSETTS, ASSIGNOR, BY MESNE ASSIGNMENTS, TO SOLESCOPE, INCORPORATED, OF BOSTON, MASSACHUSETTS, A CORPORATION OF MASSACHUSETTS

METHOD OF AND APPARATUS FOR USE IN CUTTING LEATHER

Application filed November 4, 1931. Serial No. 572,928.

This invention pertains to a method of and apparatus for use in cutting leather so as to produce shapes, parts, or figures of predetermined size and contour, and its principal object is to enable the manufacturer to secure the maximum possible number of such shapes, parts, or figures from a given piece of material while minimizing the amount of waste or scrap. In a more specific embodiment, the invention is concerned with a method of and apparatus for cutting leather into suitable shapes and sizes for use as shoe parts, whereby the cutting operation may be carried out economically, at substantially the usual speed, without waste of the expensive material employed. As illustrative of the utility of this invention, I shall hereinafter describe it with particular reference to its applicability to the cutting of shoe soles from sole leather, but with the understanding that the invention is of broader utility, and as embraced in the scope of the appended claims.

In the manufacture of cut soles it is necessary to cut the material with as little waste as is practicable, since the raw material is so expensive, while waste or scrap is of comparatively little value, but, on the other hand, the pieces of raw material as supplied to the operator are of irregular contour and vary in lateral dimensions and thickness,—contain defects which must be avoided,—and in other respects present a difficult problem to the operator who is required to cut as many commercially acceptable soles as possible from each piece of material.

In the manufacture of the better grades of sole only the firmest and most uniform portions of the hide are employed. Customarily each hide is split longitudinally along the backbone, thus forming two "sides" of leather. The head, belly and leg portions are trimmed away and the remainder of the side, known as a "back", is approximately ten feet long and about thirty inches wide. This back has a substantially straight edge along one side (the backbone line) while the remaining marginal portion,—extending along the butt, belly edge and neck, is of irregular contour. For convenience in further description, it will be assumed that the pieces of material which are furnished to the operator are complete backs or alternatively the rear portions of the backs, commonly termed "bends", and when I herein specifically refer to "backs" I intend this term as inclusive of "bends". It is to be understood that lesser portions of a hide may be cut in accordance with this novel method and by the means provided for the purpose, and further, that the present invention is applicable to the cutting of flexible inner soles or other parts from "splits". Accordingly, when reference is hereinafter made to shoe soles, it is to be understood as inclusive of inner soles as well as outer soles. Moreover, while here so particularly describing the cutting of soles, I wish it to be understood that my invention is of utility in cutting shoe uppers or other parts.

Customarily, in the preparation of cut soles, the back, or a selected portion thereof is first stripped transversely by incisions perpendicular to the backbone line, and then each of these strips is cut up into shoe soles, the strip being of a breadth (measured parallel to the backbone line) which corresponds to the length (or size) of sole which is to be cut therefrom. For highest economy in the use of the material, the length of each such strip, measured from the backbone line to the belly edge, should closely approximate an integral multiple of the width of the soles to be cut therefrom, but as the belly edge of the back or bend is irregular (so that the transverse width of the material varies), and as the width of a sole varies with its length or size, the economical cutting of the leather involves a complication of factors too intricate for the cutter to determine accurately merely by inspection, particularly when, as is common, it may be desired to cut the better part of a strip, that is, its backbone end, into soles of one width or grade, and the remainder of the strip into soles of another width or grade.

In commercial practice, prior to my invention, no measurement or calculation of the transverse width of the strip from backbone to belly edge was made, but in accordance with the present invention, and to assist the operator in determining the proper breadth of strip (longitudinally of the hide) in any given instance, I have devised a novel measuring scale based upon the relation of the commercial lengths and widths of cut soles, such scale being so calculated that when its zero or fixed datum point is disposed at one edge, for example, the backbone edge of the back, the scale reading of the opposite edge of the back will properly indicate the breadth or breadths of strip which may be cut, so that an integral number of soles of a given width or combination of widths can be made from such strip.

The leather is cut into strips by the use of a machine known as a "stripper" having a vertically reciprocating power-driven knife. The back or bend is placed upon a suitable cutting block in the path of the knife and is positioned with reference to the path of the knife by placing its forward edge (that is, the edge nearest the operator) against an adjustable stop pin which is set to determine the desired breadth of the strip. By "breadth" in this description I intend always to designate that dimension of the strip which extends parallel to the backbone line. In accordance with the present invention, I preferably use a fixed stop of graduated or stepped construction adapted to indicate any of the desired breadths of strip (or sole sizes) which may be cut, thus avoiding the necessity of resetting the stop for strips of different breadth.

Since a back or bend is heavy and of substantial length, the operator must use both hands in adjusting it to proper position for cutting, and to avoid the inconvenience attendant upon the use of a measuring rod or other physical support for my improved scale, I prefer to employ an optical scale or pattern image projected directly upon the surface of the material, such image being so produced as to be of substantially the exact size required, and usually being permanently fixed as respects its position in space. However, since this image is merely a shadow of a scale, pattern or the like, it does not interfere in the least with the movement of the material by the operator; it requires no effort on the part of the operator to apply it, other than to move the material into position for observation; it can not get lost or mislaid; it remains in full view throughout the entire operation; and the scale or pattern may be of the most complex character, if desired, and is not substantially affected by irregularities in the surface of the material to be operated upon.

According to the present invention, the leather is first stripped into transverse sections, each of a breadth which corresponds to the length of a shoe sole of selected size and of a length (measured from backbone line to belly edge) which closely approximates the sum of the widths of a plurality of integral soles of a width or widths corresponding to the selected size. The strips are then cut into individual soles by the use, for example, of apparatus known as a "blocking" machine, which comprises a pair of alternately operating knives adapted respectively to cut the opposite edges of the sole. When, as is the preferred embodiment of the present invention, the strips are adapted to be cut without waste into soles of more than one selected width, I also provide a scale, preferably optical as above described, to assist the operator of the blocking machine in deciding upon the number of soles of each width which are to be cut.

In the accompanying drawings I have illustrated certain forms of apparatus useful in carrying my improved process into effect and have indicated desirable steps comprised in the process, but without thereby intending to limit the scope of the invention and with the understanding that equivalent appliances or apparatus may be used and that the process may be modified by substitution, omission or change in order of steps, all within the scope of the appended claims.

In the accompanying drawings, wherein I have illustrated the invention by way of example as applied to the cutting of shoe soles, Fig. 1 is a diagrammatic plan view illustrating the first step in the operation according to the present invention;

Fig. 5 is a diagrammatic fragmentary plan view illustrating the first step in the chopping process in accordance with a preferred method, and indicating the appearance of the chopping scale upon the surface of the work;

Fig. 6 is a fragmentary diagrammatic plan view illustrating the chopping of the last sole from a strip in accordance with the present invention.

Fig. 7 is a fragmentary plan view illustrating the method of chopping a strip in accordance with my improved process and indicating the possibility of choice in the widths to be produced.

Fig. 8 illustrates a later stage of the process illustrated in Fig. 7;

Fig. 9 is a diagrammatic plan view illustrating the application of the present process to the cutting of soles from a back of leather;

Fig. 10 is a fragmentary plan view indicating the small percentage of waste resulting from the present method of cutting;

Fig. 11 is a diagrammatic plan view showing a leather back and indicating the usual way of designating the several parts of the back, as well as the common practice in stripping the back;

Fig. 12 is a diagrammatic view illustrating the mode of chopping strips produced as indicated in Fig. 11;

Fig. 13 is a view showing the results of chopping in accordance with the method illustrated in Fig. 12 and indicating the large percentage of waste which results;

Fig. 15 is a view similar to Fig. 14 but illustrating a scale which combines one set of graduations, generally similar in arrangement and function to those of Fig. 14, with another set of graduations for use in stripping preliminary to blocking soles into two or more sizes or grades;

Figure 1:
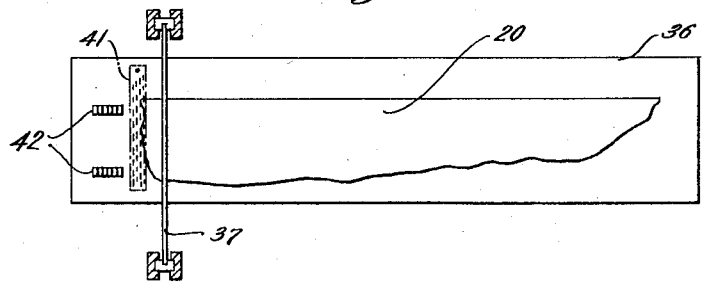
Figure 2:
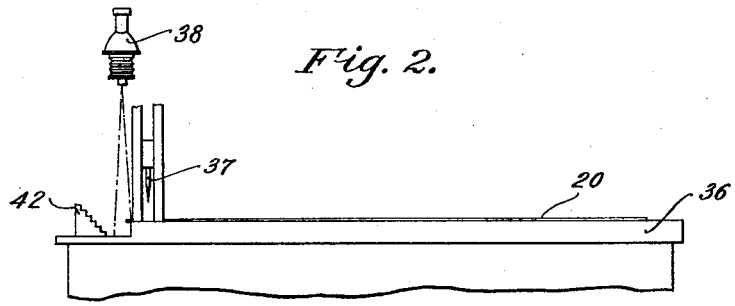
Fig. 2 is a diagrammatic side elevation showing preferred apparatus useful in performing the stripping operation.

Referring particularly to Figs. 9 and 11, the numeral 20 designates what is known to the leather trade as a "back", that is to say, one-half of a tanned hide which has been split longitudinally along the backbone line 21, and from which the head, legs and belly portions have been trimmed away, leaving irregular margins at the butt end 22, the belly edge 23 and the neck end 24. The width of the back, measured perpendicularly to the line 21, thus varies from the butt to the neck end. Such a back, as indicated in Fig. 11, comprises the butt portion;—the rear central and widest portion, called the "bend" (which constitutes the best portion of the hide);—the shoulder;—and the neck. For certain grades of sole the bend alone is used, the remainder of the back being reserved for use in making cheaper grades of sole or for other purposes. However, in the following description it will be assumed that the back, including the shoulder up to the neck portion, is to be cut in accordance with my improved method, but without in any way limiting the invention to such mode of procedure.

In accordance with the present invention the back 20 is first cut transversely by incisions (indicated by the dotted lines in Fig. 9) extending substantially perpendicular to the backbone line 21, thus forming strips 25, 26, 27, 28, 29, etc., each such strip being of a breadth (measured parallel to the backbone line) corresponding to the length of a cut sole of a certain size. In women's soles, for example, standard sizes vary by differences of one-quarter inch, while the widths of such soles vary by differences of three-sixteenths of an inch. It is to be noted that a given sole width, for example, EE in a No. 6 sole, does not correspond in actual measurement to that of an EE width in a No. 8 sole. Moreover, men's sole sizes are different from women's sole sizes, while sole patterns vary with different manufacturers as to grade or length. Thus, the width and length at least must both be considered and treated as dependent variable factors in determining the area of material necessary to make a given sole.

Since an object of the present invention is to cut the back into strips of such length (measured perpendicular to the backbone line 21) that each strip can thereafter be cut into an integral number of soles of a standard width or widths, or combination of widths without substantial waste, it follows that it may be necessary or desirable to cut successive strips to different breadths. Thus, as shown in Fig. 9, the strip 25 is broader than the strip 26. For example, the strip 25 may correspond in breadth to the length of a No. 8 sole, while the breadth of the strip 26 may correspond to the length of a No. 7 sole. In each instance, as indicated in this figure, an equal number of soles of the same width, for example EE, may be cut without substantial waste, since the aggregate width of the No. 7 soles is enough less than the No. 8 soles to make up for the lesser length of the strip 26 resulting from the irregular margin 23 of the back. While the entire strip 26 is shown as cut into soles of the same width, an alternative procedure may be possible under certain conditions, as indicated at the strip 27, which is of substantially the same length as the strip 26 but which is indicated as cut into one group 27$^a$ of soles of a narrow width, and a second group 27$^b$ of a greater width, although the length or "size" of all of these soles is the same. On the other hand, entire strips of the same length, for example, strips 28 and 29, may under certain conditions be cut into soles of different sizes and different widths, and it is thus evident that in cutting the back in accordance with the present system a wide range of choice is often possible in determining the predominant size and width which shall be produced.

In Fig. 10 I have indicated the usual and expected result of this mode of cutting, it being noted that the only waste is the narrow piece 31 at the backbone line and the narrow piece 33 at the belly edge. This minimized waste results from the fact that in accordance with the present invention the breadth of each strip is predetermined immediately before cutting, whereas by the usual method, as illustrated in Figs. 11 and 13, the breadth of all strips cut from a given back is the same, with the result that at the belly edge of the strip large fractional portions of soles, such as shown at 34 in Fig. 13, frequently remain as waste. Thus, since there are usually from four to five strips to a bend, or seven or eight to a back, depending upon whether men's or women's soles are being cut, and since the waste, in accordance with the usual process may vary from a mere thread to seven-eighths or more of a sole, it follows that the average waste in cutting women's soles will approximate three soles to the back, and in cutting men's soles will approximate two and five-eighths soles. Since the value of the waste as scrap is only about one-tenth of the raw material, it is evident that the present invention, whereby this high percentage of waste is eliminated, is of great importance to the trade.

As noted in the above description of the general mode of operation, the present method permits the operator to exercise a considerable range of choice in cutting the material, so that if soles of a certain size and width are predominantly desired or if it be required to cut more soles of a different size or width from one portion of the back than from another portion, the operator, in cutting, may give preference, wherever choice is permitted, to soles of the required characteristics, and thus while providing for the desired reduction in waste, my new method has the further advantage (as compared with usual methods) of enabling the operator to cut the desired kinds of sole to make up standard commercial cases or to fill orders with less accumulation of overstock or unneeded sizes.

For use in practicing my novel method, I have devised two scales or measuring devices, one for use in stripping and the other for use in chopping. When cutting soles of one width only from a given strip, the stripping scale alone is necessary, but in case I desire to cut soles of more than one width from a strip, I supplement the preliminary or stripping measurement by a second measurement at the chopper, for which I provide a second scale, graduated to inform the operator of the chopping machine as to how many of each width of sole must be cut in order to use up the entire strip without substantial waste.

Figure 14:
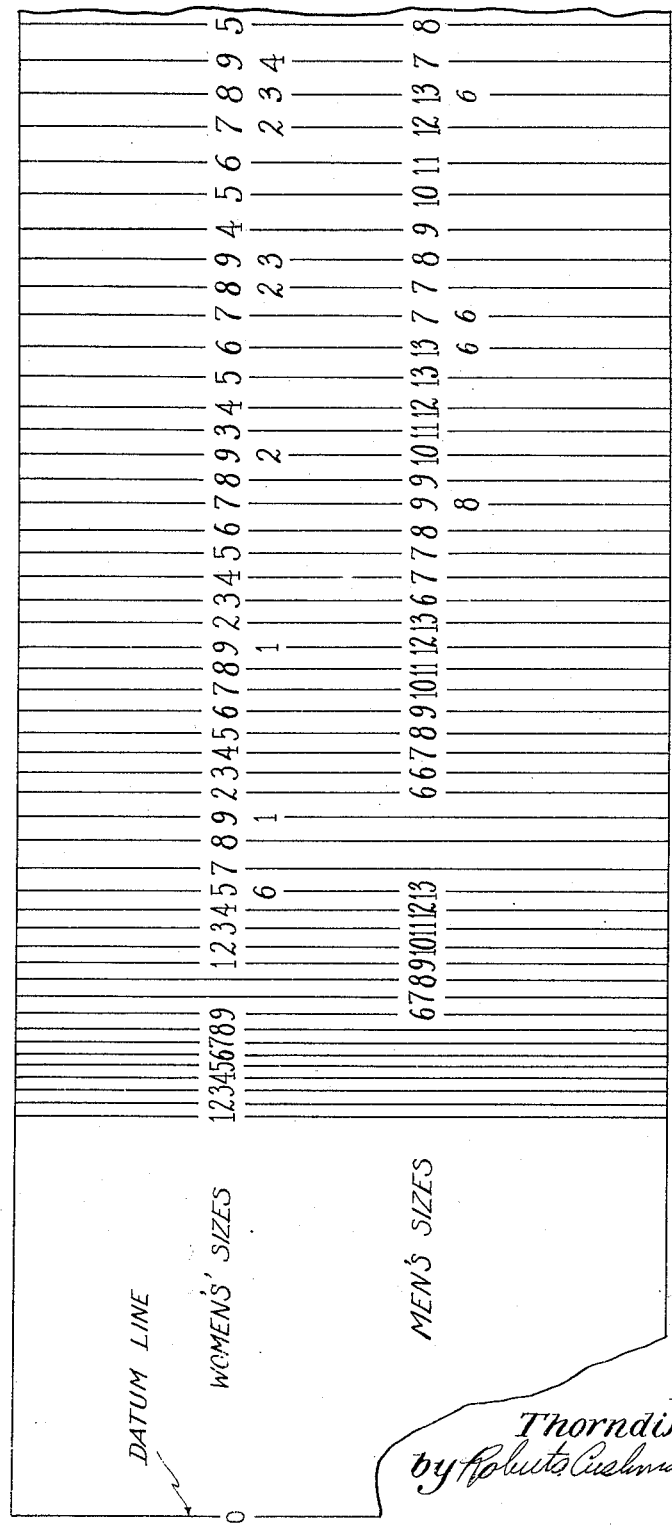
Fig. 14 is a fragmentary plan view illustrating a scale having a simple form of graduation and useful in performing the stripping step of my improved process, particularly when the soles are to be blocked to but one width or grade.

The stripping scale preferably comprises a distinctive datum or zero point or line near one end, which is applicable, for example, to the backbone edge of the back, and in its simpler form, as shown in Fig. 14, has a series of spaced transverse graduations adapted for registration with the opposite or belly edge of the back. These graduations are respectively spaced from the datum line so that the distance between any graduation and the datum line equals an integral multiple of standard sole widths, such graduations being indexed to indicate the corresponding sole size. Thus, if the scale be applied to a back in the manner suggested, the graduation which registers most nearly with the belly edge will indicate directly that a sole of the size designated by such graduation may be cut in integral multiples of some definite width from that part of the back with minimum waste.

This scale may comprise a single set of graduations, when cutting the entire strip to one width of sole, but as it is a fact that in some cases, at least, a multiple of sole widths, corresponding to one size, equals a multiple of sole widths corresponding to another size or sizes, it follows that at intervals along a scale, such as shown in Fig. 14, the same graduation may correspond to two or more permissive breadths of strip, or, in other words, to two or more sole sizes, and such particular graduation may thus be indexed for two or more sole sizes, so that the operator may then select the breadth of strip (or sole size) to be cut, knowing that whichever size he selects may be cut into an integral number of soles of a corresponding width. Obviously the distance between such a composite graduation and the datum line is a common multiple of the widths corresponding to the respective sizes.

While each strip may be chopped into soles of the same width or pattern, it is customary in most factories to cut two widths of sole from one strip; thus, since the EE sole is wider than the E sole and is more marketable in poor qualities than E's, the operator will usualy cut the E widths from the backbone end of the strip and will then lay the remainder of the strip aside to be cut at a later time into soles of wider width and poorer quality.

In Fig. 15 I have shown a composite scale having one set of graduations denoted by the symbol M corresponding in function and mode of use to the scale of Fig. 14; and a second set of graduations, denoted by the symbol W, which are to be used when the strips are to be cut into soles of more than one width. As indicated, the lower set of size graduations (Fig. 15) has the letters E—EE at one end to indicate that the soles to be cut from a strip are in combinations of E and EE widths, and the size graduations are in the form of groups of discontinuous longitudinal lines, the length of each such line indicating the amount of tolerance or difference in strip length corresponding to an equal multiple of the narrower widths E, and the wider widths EE, respectively.

More specifically, and referring to Fig. 15 if the belly edge of the leather back fall on the line $a$—$b$ of the scale, the operator will understand that an even multiple of No. 4 soles in E width may be cut without waste, while, on the other hand, if the belly edge of the back fall on the line c—d, it indicates that an even multiple of No. 4 soles in EE width may be cut without waste. If the edge fall at any point between the lines a—b and c—d, then the operator knows that in size 4 some combination of E and EE widths may be cut without waste.

As shown in Fig. 15, the graduation 5', for example, overlaps the graduation 6', and thus if the belly edge of the leather fall between the lines e—f and g—h, the operator knows that he may cut soles in either No. 5 or No. 6 size, and that in either event some combination of E and EE widths can be cut from the resulting strip without waste. The operator thus proceeds, in accordance with directions given him by the manufacturer, to cut the strip to that breadth (sole size) within the indicated range of choice, which will furnish the greatest number of soles of the size particularly desired.

Figure 16:
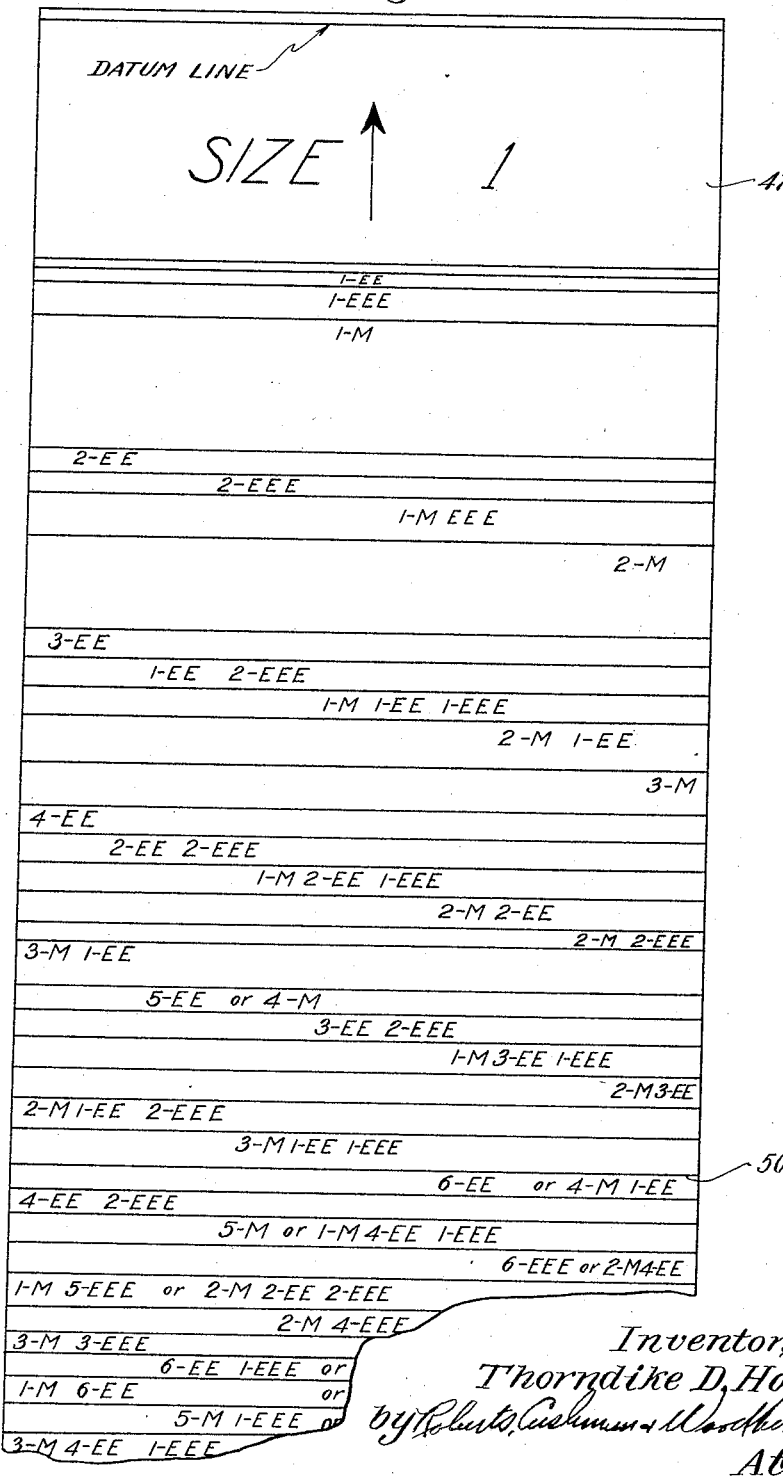
Fig. 16 is a fragmentary plan view showing one form of scale useful in performing the chopping step of my improved process.
Figure 17:
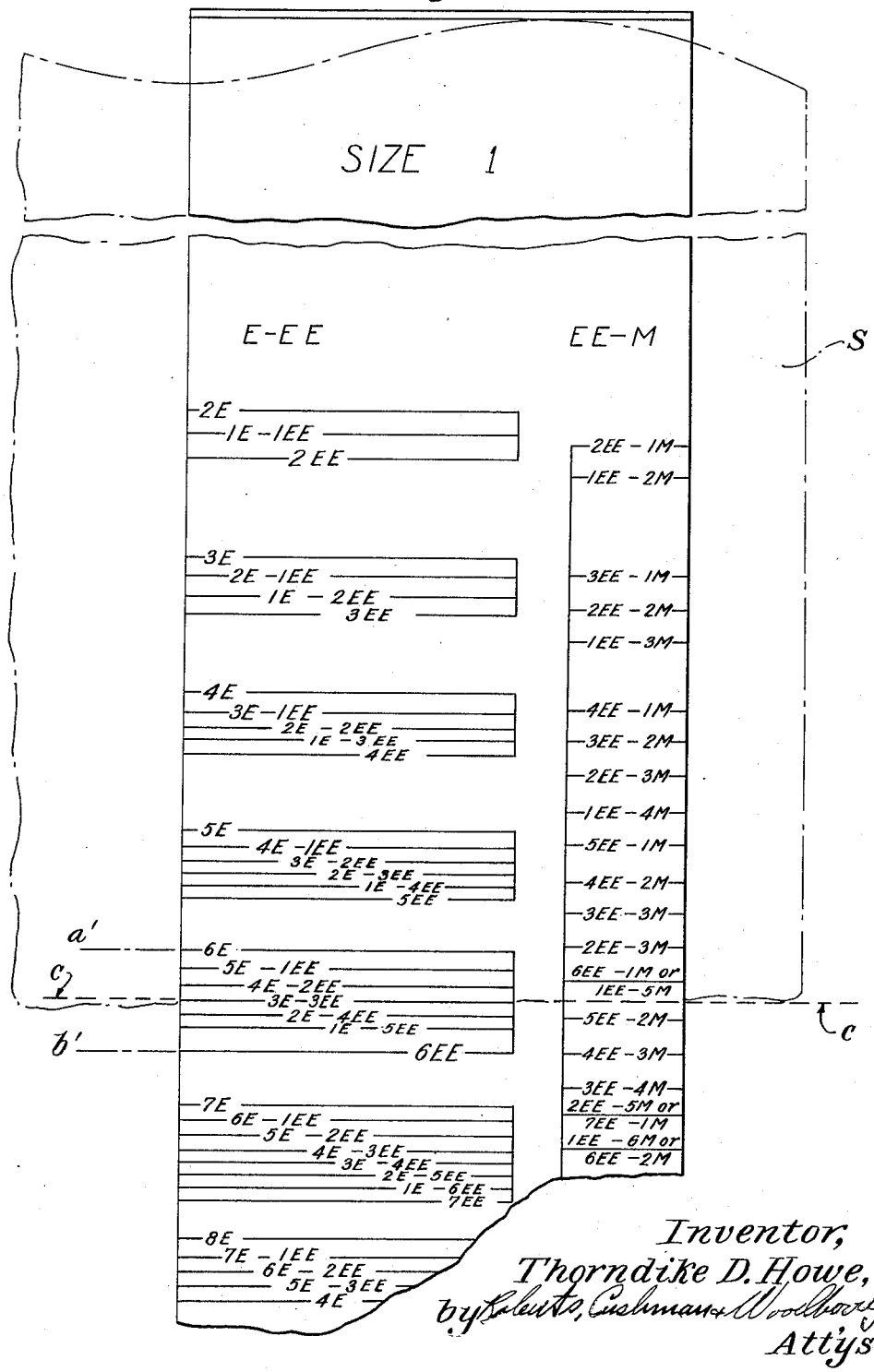
Fig. 17 is a fragmentary view showing a preferred form of chopping scale.

Since this measurement thus made results in strips corresponding in length to various combinations of sole widths, it must be supplemented by a separate measurement at the blocking machine, and this measurement is made by the use of a chopping scale, preferably as shown in Fig. 17, or alternatively by a scale as shown in Fig. 16.

Referring to Fig. 17, the chopping scale has a series of width graduations adjacent to its left-hand edge, designated by the letters E—EE showing that the graduations indicate combinations of E and EE widths, while near its right-hand edge the scale, if desired, may have another series of graduations designated by the letters EE—M showing that the graduations at that side relate to combinations of women's EE widths with men's widths. A scale having either the right or left-hand series of graduations alone may be used, or the graduations illustrated may be replaced by others appropriate to the intended purpose.

Let it be assumed, for example, that a strip S (Fig. 17) of leather has been cut to a selected breadth (measured substantially parallel to the backbone line and corresponding to a given sole size) and that the backbone end of the strip has been "shanked", that is,—has been cut on the blocking machine to the contour of one edge of a shoe sole. The datum line of a chopping scale, graduated to the corresponding sole size (such a scale being provided for each size, and being graduated, for example, like the scale of Fig. 17), is brought into registry with the shanked edge of the strip and the operator observes the position of the belly end of the strip on the graduated part of the scale. As shown in Fig. 17, these graduations preferably are disposed in groups, the upper and lower limits of a group, as shown at a', b', for example, indicating a certain range of strip lengths between which combinations of E and EE widths may be cut. Thus if the end of the strip fall, as indicated by the broken line C—C, the operator knows that he should cut three E width soles and three EE width soles, whereas if the belly edge of the strip fall on the line a', for example, he should cut six E widths. Likewise, if the edge fall between adjacent graduations, he may choose that combination which will give him the most soles of the desired size.

Figure 19:
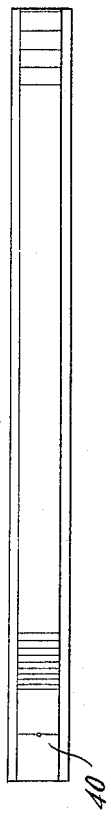
Fig. 19 is a plan view of a scale carried by a rigid stick or other support and adapted for use alternatively with the lantern slide of Fig. 18.
Figure 18:
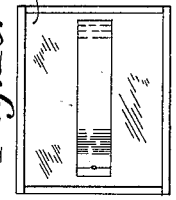
Fig. 18 is a plan view of a lantern slide having a stripping scale thereon and useful in accordance with the present method.

While some of the advantages of my improved scales might possibly be obtained if each scale were to be placed upon a rigid support, for example, the surface of a work rest or a freely movable scale stick, as shown at 40 in Fig. 19, or upon a flexible tape or other support, I prefer to inscribe the scale, reduced in dimensions, upon a lattern slide, as indicated at 39, Fig. 18, and to project its image optically by means of a suitable projecting lantern, including a lens system, if desired, upon the surface of the work to be measured. The projecting apparatus is so devised that the image on the work is to full and accurate scale, and as the image is fixed in space, the operator is free to use both hands in moving the material into proper registry with the scale image, and is relieved of any necessity of positioning the scale upon the work preparatory to taking the measurement.

Referring to Figs. 1 to 4 inclusive, the numeral 36 designates a suitable work table such as the block or work rest of a stripping machine. Such machines are well known in the art and comprise a vertically reciprocating straight-edged cutter or knife 37 suitably guided and actuated by usual means, not shown. At a proper distance above the forward part of the work table I arrange the projecting lantern 38 (Fig. 2) which may be of any usual type provided with a source of light and preferably having a lens system adapted to project the scale image 41 in accurate and proper dimensions upon the surface of the work resting upon the support. The lantern is provided with means for supporting a slide 39, with provision, if desired, for changing the slide so as to project a different scale, if that should be desirable.

To facilitate the work of the stripping operator, I prefer to provide the stripping machine with fixed abutments 42, each abutment having a stepped face directed toward the cutter, the risers of the steps forming stops for engagement with the forward edge of the work. These steps are numbered according to sole sizes, the distance from any step riser to the plane of the cutter substantially equaling the length of a shoe sole of the indicated size. If desired, the forward part of the table may be depressed slightly below the rear part of the table so as to minimize errors in measurement due to elevation of the forward edge of the work in bringing it into engagement with a selected step of the abutment.

Figure 3:
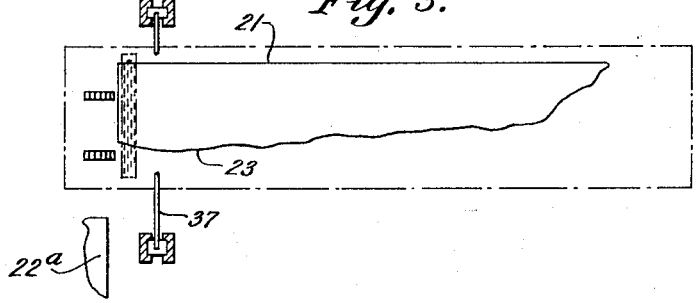
Fig. 3 is a view similar to Fig. 1, illustrating a later step in the stripping process.
Figure 4:
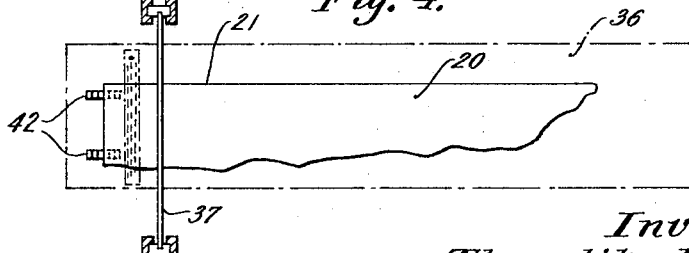
Fig. 4 is a similar view illustrating a further step.

In operation a pile of backs is placed upon the table 36 (only one back is here shown at 20) and with the knife 37 in an elevated position the operator pulls the back toward him, as shown in Fig. 1, until its butt edge extends forward of the cutter to a distance which he determines by experience. The knife is then caused to descend, thereby cutting off the butt end 22$^a$, which is shown in Fig. 3, such butt end being used for other purposes. After the knife has again risen, the operator pulls the work forward and moves it laterally, if necessary, until the datum point or zero of the fixed scale image 41 substantially registers with the backbone edge of the back, as illustrated in Fig. 3. He then notes the reading of the scale graduation which most nearly registers with the belly edge 23 and thereby determines which breadth of strip he will cut. Having made this determination, he pulls the forward edge of the work into engagement with that riser of the stepped abutment which is marked with the determined size, and then causes the knife to descend, thereby cutting off a strip of the predetermined breadth. He then places this strip aside, pulls the work forward, again measures it by reference to the scale and repeats the cutting operation, continuing to work in this manner until he has cut up the entire back, or such portion thereof as is useful in making soles of the grade which are required, then continuing with the other backs upon the work table until the entire lot has been cut. After the strips have been cut, the assorted breadths (sole sizes) are taken to the blocking or chopping machines.

The blocking machine, by means of which the strips are cut into individual soles, commonly comprises a work supporting table and a pair of vertically moving knives, the knife edges having complementary contours and corresponding to a right and a left sole edge, respectively. The knives are spaced apart, when properly adjusted, a distance equal to the width of a sole to be cut.

In Figs. 5, 6, 7, 8 and 12 I have diagrammatically indicated such machines, having the cutters 45 and 46, the cutters being shown as spaced differently in the machines of Figs. 7 and 8, respectively, in order to cut soles of different widths. These cutters commonly move alternately, one rising while the other descends, and as they move, the operator feeds a strip beneath them so that the strip is chopped into soles each of the same width, the left edge of one sole butting in reverse the left edge of the next succeeding sole. Since in accordance with the present invention each strip is of a length closely approximating an integral number of sole widths or combinations of widths, the result of the chopping operation is, as shown in Fig. 6, where the last full sole is being cut by the cutter 46, and only the small piece 33$^a$ of waste is left. On the other hand, as above noted, when the entire back is stripped to uniform widths according to usual practice, the chopping operation frequently results in the production of waste pieces such as indicated at 34$^a$ in Fig. 12.

When but a single sole width is to be chopped from a given strip, the operator needs to make no further measurement before feeding the strip to the blocking machine, since the machine is set to the proper width, and as the strip is an integral multiple of such width, it is only necessary to feed the strip to the machine to cut it to the best advantage. However, when with the assistance of a scale such as that of Fig. 15, for example, the leather has been stripped corresponding to a combination of widths, the operator must then make use of a scale such as shown in Figs. 16 or 17, as above described, to indicate how many soles of each width should be cut from the strip. Thus, having proceeded as above suggested to shank the strip, he observes the reading of the scale (the scale preferably being optically projected upon the work and the chopping machine having a lantern and slide arranged above the machine in the same way as at the stripper) and then proceeds to chop the strip into the indicated number of soles of each of the widths shown by the chopper scale. Usually soles of the better grade are first chopped from the backbone end of the strip, leaving the belly end of the strip to be cut into soles of a different width and grade.

When several widths or grades are to be cut from a given strip, the chopping scale may be so graduated as to show more than one possible combination of widths or grades. Thus, for example, at the point 50 on the scale of Fig. 16, the scale reading indicates the possibility of cutting six women's soles of EE width, or alternatively the possibility of cutting four boys' soles and one woman's sole of EE width. Again, assuming, for example, that a given scale indicates the possibility of cutting eight E width soles or alternatively two E widths and five EE widths, and assuming that a greater proportion of EE widths is desired, particularly in the lower grade of soles, the operator may proceed as indicated in Figs. 7 and 8, first cutting two E width soles 51 from the backbone end of the strip, by the use of the blocking machine 52 having its cutters set to E width, and then cutting the remainder or belly end of the strip into five EE width soles 51$^a$ on the blocking machine 53 set to cut such widths. Obviously, if desired, the first machine 52 could be reset to the EE width, after cutting the two E soles, and the remainder of the strip could then be cut on the same machine to make the five EE soles, so that the entire strip would then be cut up by the same operator in a substantially continuous operation on the same machine. Alternatively, the same strip, as indicated in Fig. 7, might be cut on the machine 52 to form eight E width soles.

Obviously when in preparing to cut the material, defects or marked variation in thickness in the material occur within the area upon which the scale image is formed, the operator will select that combination of integral parts which can be cut most advantageously so that parts of the same size will be of substantially uniform thickness and without inclusion of series defects.

In the commercial preparation of cut soles, the soles are customarily marketed in packages called cases, each consisting of sixty pairs tied up in bunches of assorted sizes. Usually a case of women's soles contains ten pairs of size 4, fifteen pairs of size 5, twenty pairs of size 6, ten pairs of size 7, and five pairs of size 8, and in cutting the material the operator usually tries to cut soles as nearly as possible to the make-up of a case, as above described.

In accordance with the usual system, the operator determines how many backs of sole leather must be cut to produce each size of sole in the proper proportions. This number usually is a multiple of the number of any particular size constituting the case. At the end of the run, cases are made up as far as possible in their respective sizes, qualities and weights from the soles which have been cut. Those soles which can not be properly matched in making up the cases are carried as overstock to be matched in succeeding runs, but the accumulation of overstock should be kept as nearly at a minimum as possible, since any such accumulation represents a substantial investment of non-productive capital. In order to match this overstock, succeeding runs are usually augmented or decreased by the number of whole backs necessary to make up the particular sizes which are most needed. On the other hand, in accordance with the present invention, due to the measurement tolerance in cutting strips from the back, as already described, it is possible to make up sizes from pre-cut strips which most nearly correspond to the qualities and weights in which the overstock has appeared.

It will be evident that my improved method provides for the economical cutting of leather in commercial quantities and at commercial speeds into soles of requisite size and grade with a minimum amount of overstock and that in its preferred embodiment the invention contemplates the employment of two scales such as above described, adapted to guide the operator in performing the stripping and chopping operations respectively, but so coordinated in function that each scale supplements the other in controlling the mode of procedure. It will further be noted, as already suggested, that when the optically projected scale image is employed, such image is always in full view of the operator and actually in operative position upon the surface of the work although without in any way interfering with the movement of the work or of the operator's hands.

In commercial production my improved process has under some conditions been found to give an increase of as much as 1½ pairs of marketable soles from a leather back, and a reduction in weight of waste of approximately 50%,—as compared with usual practice.

Some backs have a sharp break at the brisket, as shown by the dotted line $z$, Fig. 11, and thus it may be most economical to strip the back so that the edge of the last strip will substantially coincide, for example, with the line $m$—$n$, thus avoiding wasting the area indicated at $y$, rather than to proceed according to the above-described method, whose primary object is to avoid waste at the belly edge of the back. Thus while in the above description I have indicated that the first application of the scale is for measuring a back from backbone to belly edge, I contemplate that under some conditions it may be desirable to provide a further or third scale for measuring the back longitudinally prior to performing the stripping operation, and that such scale may be so coordinated with the other scales as to apprise the operator, as he reaches the shoulder portion of the back, of the mode of procedure best calculated to avoid waste.

While I have described the cutting of a back or bend as an instance of the utility of the invention, the method herein described or the equivalent thereof may be applied to the cutting of belting butts, splits, or in fact any other area or portion of a skin or hide, as may be desired, and though I have herein specifically described certain desirable embodiments of the invention by way of example, I wish it to be understood that the invention is not thereby limited, but that any suitable variations and substitutions may be made within the scope of the appended claims.

I claim:

1. That method of cutting shoe parts which comprises the steps of optically projecting upon the exposed surface of the material, from which the parts are to be cut, image indicia showing permissive sizes and shapes of shoe parts which may be cut from a selected area of said material without substantial waste, and cutting said shoe parts according to said indicia.

2. That method of cutting shoe parts of predetermined shapes and predetermined sizes, which comprises the step of applying to a selected area of material, from which the shoe parts are to be cut, an indicator showing one or more of said predetermined sizes which may be cut from said area without substantial waste, and cutting said shoe parts of the size or sizes determined by the indicator from the selected area of the material.

3. That method of cutting leather into shoe parts which comprises as steps employing measuring indicia, imposing said indicia in the path of a beam of light, causing the resulting optical image of such indicia to fall on the surface of the leather, and cutting the leather into shoe parts by reference to such indicia.

4. That method of cutting material into shoe parts each of some predetermined size, which comprises as steps employing a device having indicia showing combinations of numbers and sizes of such parts which can be cut without substantial waste from an area of given dimensions, imposing an optical image of such indicia directly upon the surface of such material, relatively shifting the image and material to determine that combination of numbers and sizes of parts which can best be cut from the given piece of material without inclusion of inferior portions of the material, and cutting the material into parts in accordance with said determination.

5. That method of economically dividing leather for use in making parts of predetermined areas which comprises employing a device having thereon indicia showing a possible aggregation of such parts which may be cut from a given area of the leather, imposing an optical image of such indicia upon the surface of the leather, relatively positioning the leather and the indicia carrying device so as to cause the image to lie upon a selected part of the leather, and, by reference to the indicia image, cutting from that portion of the leather upon which the image rests a piece of a size such that said aggregation of parts may be cut therefrom.

6. That method of cutting leather for shoe parts of predetermined lengths and corresponding predetermined relative widths, which comprises the steps of measuring the transverse extent of a piece of leather to determine the range of lengths within which combinations of corresponding widths will substantially aggregate the measured dimension, selecting a length from said range, and cutting a transverse strip from said piece of leather of a breadth corresponding to said selected length.

7. That method of cutting leather for shoe parts of predetermined lengths and corresponding predetermined relative widths which comprises the steps of optically projecting upon the exposed surface of the leather an image scale showing a permissive range of lengths within which combinations of corresponding widths will substantially aggregate the breadth of the leather, selecting a length from said range and cutting a strip from said leather of a breadth corresponding to said selected length.

8. That method of cutting leather for shoe parts of predetermined lengths and corresponding predetermined relative widths which comprises the steps of optically projecting upon the exposed surface of the leather an image scale showing a permissive range of lengths within which combinations of corresponding widths will substantially aggregate the breadth of the leather, selecting a length from said range and cutting a strip from said leather of a breadth corresponding to said selected length, optically projecting upon the exposed surface of said strip an image scale showing possible combinations of integral widths of shoe parts which can be cut from the strip without substantial waste, and cutting the strip into shoe parts in accordance with one of the indicated combinations.

9. That method of cutting leather into shoe parts of predetermined lengths and corresponding predetermined relative widths, which comprises measuring the lateral extent of a piece of leather to determine the range of lengths within which combinations of corresponding widths will substantially aggregate the measured dimension, selecting a length from said range and cutting a transverse strip from said piece of leather of a breadth corresponding to the selected length, applying to the strip a scale having indicia operative to show possible combinations of integral widths of shoe parts which can be cut from the strip without substantial waste, and cutting the strip into shoe parts in accordance with one of the indicated combinations.

10. That method of cutting leather which comprises as steps mounting a piece of leather upon a suitable support, providing a light source at a predetermined distance from said support, interposing between the light source and support a screen bearing in miniature the desired scale of measurement, the dimension of the screen scale and its distance from the support being such that an optical image of the scale to substantially standard size appears upon the exposed surface of the article, and causing a cutter to act upon the leather at a point determined by observation of the scale image thereon.

11. That method of cutting leather for use in making shoe parts which comprises as steps projecting upon the exposed surface of the leather an optical image of a size determining scale, the scale image being of accurately predetermined size, adjusting the leather until one edge coincides with the zero of the scale image, observing the reading of the scale image at the opposite edge of the leather, adjusting the leather in accordance with the observed reading with reference to the fixed path of a movable cutter, and causing the cutter to move and sever a strip from the piece of leather.

12. That method of stripping leather backs which comprises as steps optically projecting upon the exposed surface of the back an image scale showing a permissive range of sole sizes which may be cut from the back, selecting a size within said range, and severing from the back a strip of a breadth correspond to the selected size.

13. That method of preparing cut soles from a tanned leather back which comprises as steps cutting the back into strips by successively formed incisions each substantially perpendicular to the backbone edge of the back, first measuring the width of the back from backbone to belly edge immediately before making each incision to determine a breadth of strip whose length, from backbone to belly edge substantially equals the sum of varying numbers of sets each set consisting of a number of shoe widths all of the same size corresponding to the determined breadth of the strip, then forming the incision to cut from the back a strip of the determined width thereafter selecting, from possible combinations of sole widths which collectively would substantially equal the length of the strip without waste, that combination which will produce the greatest number of soles of the size and width which are predominantly desired, and dividing the strip in accordance with such selection.

14. That method of preparing cut soles from a piece of leather having a substantially straight edge and an opposite irregular edge, which comprises the steps of measuring the breadth of the leather in a direction perpendicular to the straight edge across an area of the leather to be included in a strip, to determine the range of shoe sole sizes within which combinations of integral sole widths will substantially aggregate the measured dimension, selecting a sole size from said range, and cutting the strip from said piece of leather of a breadth corresponding to said selected sole size.

15. That method of preparing cut soles which comprises as steps measuring the lateral extent from backbone to belly edge of a leather back to determine the range of sizes within which combinations of integral sole widths will aggregate the measured dimension, selecting a size from said range, cutting a strip of a breadth measured substantially parallel to the backbone corresponding to the selected size, applying to the strip a scale having indicia operative to show possible combinations of integral sole widths which can be cut from the strip without substantial waste, and cutting the strip into soles in accordance with one of the indicated combinations.

16. That method of stripping sole leather preparatory to blocking cut soles which comprises as steps dividing a back or bend of leather into sections by successive incisions each extending substantially perpendicular to the backbone line, each section being of a breadth, measured longitudinally of the backbone line, corresponding to the length of a sole of a standard size, the breadths of the respective sections being so determined just prior to cutting that each section, measured from backbone to belly edge, substantially equals an integral number of standard widths of sole of the sole size to which the breadth of the particular strip corresponds.

17. That method of preparing cut soles which comprises as steps arranging a scale to extend transversely across a leather back from backbone to belly edge, said scale having indicia designed to show a range of sizes within which combinations of integral sole widths will aggregate the lateral extent of the back from backbone to belly edge, selecting a size from the indicated range, cutting a strip of a breadth corresponding to the selected size, determining possible combinations of integral sole widths which can be cut from the strip without substantial waste, selecting such a combination, and cutting the strip into soles in accordance with such selection.

18. That method of preparing cut soles which comprises as steps cutting a leather back into strips by successive incisions substantially perpendicular to the backbone line, each strip being of a breadth, measured parallel to the backbone line, which corresponds to the length of a shoe sole of a standard size,—first determining the breadth of each strip by arranging a scale so as to extend from backbone to belly edge of the back, said scale having indicia operative to show a range of sole sizes, within which certain combinations of corresponding sole widths will aggregate the length of the strip to be cut, and from such range of sizes selecting the desired breadth of each strip prior to cutting the strip,—arranging a second scale so as to extend from backbone to belly edge of each strip after cutting, said second scale having indicia operative to show the combination of integral sole widths which can be cut from the strip without substantial waste, and cutting the strip into soles in accordance with the indicated combination of widths.

19. That method of preparing cut soles which comprises as steps supporting a leather back upon the bed of a stripping machine having a movable cutter, optically projecting downwardly upon the surface of the leather a scale image arranged to extend transversely of the back from backbone to belly edge and operative to show a range of permissive sizes within which a strip may be cut such that the length of such strip will equal the aggregate of integral sole widths making up any of a plurality of possible combinations of sole widths of a given size, selecting a size within said range, causing the cutter to sever a strip of a breadth, measured substantially parallel to the backbone line, corresponding to the selected size, optically projecting downwardly upon the surface of the strip a scale image arranged to extend longitudinally of the strip from the backbone end toward the belly edge, and operative to show permissive combinations of width into which the strip may be cut, selecting such a combination, and chopping the strip into soles in the proper number and width to make up the selected combination.

20. That method of preparing cut soles which comprises as steps supporting a leather back upon the bed of a stripping machine having a movable cutter, arranging a scale transversely of the forward portion of the back, said scale having indicia operative to show a range of sizes within which combinations of integral sole widths will aggregate the lateral extent from backbone to belly edge of the back, selecting a size from the indicated range, adjusting the back with respect to the path of the cutter to permit cutting a strip of a breadth, measured substantially parallel to the backbone line, corresponding to a sole length of a selected size within the determined range, actuating the cutter to sever the strip, arranging a scale to extend longitiudinally of the strip from backbone to belly edge, said scale having indicia operative to show possible combinations of integral sole widths which can be cut from the strip without substantial waste, presenting the strip to a chopping machine having knives set to cut soles of a width included in one of said combinations, causing the machine to cut soles of such width from the strip, and presenting the remainder of the strip to a chopping machine having knives set to another of the widths included in the selected combination and causing the latter machine to cut soles from the strip.

21. That method of chopping shoe soles which comprises as steps projecting upon the exposed surface of a strip of leather an optical image showing possible combinations of sole widths which may be cut from the strip without substantial waste, and chopping the strip to correspond to one of such possible combinations.

22. Apparatus for use in dividing a piece of leather into portions each of some predetermined standard size, said apparatus comprising a support for the leather, a tool for dividing the leather, and means operative during the dividing operation to impose directly upon the surface of the leather intangible indicia devised and arranged to indicate the number of integral portions and the sizes of such portions which may be cut without waste from such piece of leather.

23. Apparatus for use in dividing material into shoe parts each of some predetermined standard size, said apparatus comprising a support for the material, a tool for dividing the material, and means for imposing directly upon the surface of the material intangible indicia showing a proper disposal of the material relatively to the tool, said indicia-imposing means being so constructed and arranged that the indicia imposed thereby upon the material does not interfere with freedom of manipulation of the material by the operator.

24. Apparatus for use in operating upon leather comprising a support for the material, and operating tool and means, disposed out of the field of operation of the tool, operative to form an optical image directly upon the surface of the material, such image comprising indicia indicating to the operator a proper location of the material relatively to the tool, the indicia-forming means being so positioned and arranged as to permit free relative movement between it and the material resting on the support while maintaining the image on the material.

25. Apparatus for use in dividing a length of material into shoe parts each of some predetermined standard size, said apparatus comprising a support for the material, a cutting tool, a limit stop for engagement by one end of the material during the operation of the cutter, and means operative, throughout the entire operation of dividing the length of material, to impose directly upon the surface of the material intangible indicia arranged to inform the operator, when the end of the material engages the limit stop, of a possible combination or combinations of sizes of shoe parts which may be cut without substantial waste from the then remaining portion of the original length of material.

26. Apparatus for use in dividing a length of leather into portions each of some predetermined standard width, said apparatus comprising a support for the material, a tool for dividing the material, and means operative, prior to initiation of the dividing operation, to impose directly upon the surface of the material scale markings so devised and arranged that the scale marking falling nearest adjacent to one end of the material directly shows at least one combination of sizes which, in integral number, can be made without waste from said length of material.

27. Apparatus for cuting material into shoe parts each of some predetermined size, said apparatus comprising a cutter, a support for the material, and means operative to impose upon the surface of the material a temporary optical image indicative to the operator of the integral number of shoe parts of standard size which can be made without substantial waste from the piece of material.

28. Apparatus of the class described comprising means for cutting leather into strips and means for thereafter dividing the strips into individual shoe soles, said apparatus comprising means for optically projecting scale images upon the work during each cutting operation, one of said scale images being designed to indicate a range of sizes within which combinations of integral sole widths will aggregate the lateral extent of the strip to be cut, and the second scale image being designed to indicate possible combinations of integral sole widths which can be cut from the strip without substantial waste.

29. An appliance for use in preparing cut soles, said appliance comprising a scale having a datum point for registry with the backbone edge of a back of leather and having scale markings for registry with the belly edge of the back, said scale markings comprising staggered parallel indexed lines extending longitudinally of the scale, each such line when overlapping the belly edge of the back indicating that the size of sole designated thereby will extend, in integral number in certain widths when placed side by side across the back, from backbone line to belly edge without substantial waste.

30. An appliance for use in preparing cut soles, said appliance comprising a scale having a datum point for registry with one end of a strip of leather and having a series of scale markings adapted to extend lengthwise of the strip, said scale markings being so devised that the one which registers with the opposite end of the strip indicates possible combinations of sole widths any of which will extend from one end to the other of the strip without substantial waste.

31. Apparatus for use in cutting leather for shoe soles comprising a support for a piece of sole leather having a substantially straight edge and an opposite irregular edge, a cutter movable toward and from the support in a fixed path, and means above the support for optically projecting upon the surface of the leather a scale having a datum point and a series of size designating graduations so designed that when the datum point registers with one edge of the leather the graduation which most nearly coincides with the opposite edge will indicate a breadth of strip such that soles of corresponding size may be cut therefrom in integral multiple of sole widths without substantial waste.

32. Apparatus for use in cutting leather for shoe soles comprising a support for a piece of sole leather having a substantially straight edge and an opposite irregular edge, a cutter movable toward and from the support in a fixed path, and means above the support for optically projecting upon the surface of the leather indicia for designating the combination or combinations of integral sole widths which in a given size will aggregate the distance between the edges of the material without substantial waste.

33. Apparatus for use in cutting material for shoe parts, said apparatus comprising a support for the material, a cutter, a lantern slide carrying indicia operative to indicate a proper mode of cutting the material, and means for projecting an image of such indicia optically upon the surface of the material resting upon the support, the projecting means being so constructed and arranged as to produce an image of substantially exact predetermined size upon the material.

34. Apparatus for use in cutting leather comprising a support for the leather, a movable cutter, and means for optically projecting upon the surface of the leather an image designating a proper relative position of the leather and cutter such as to enable the operator to cut the leather with a minimum of waste.

35. Apparatus for use in cutting leather for shoe soles comprising a support for a piece of sole leather, a cutter movable toward and from the support in a fixed path, and a pair of laterally spaced fixed stops, each stop having a series of stepped abutments whose distances from the path of the cutter correspond respectively to a series of sole sizes, and means for indicating to the operator a choice of abutments with which the material may be engaged whereby the operation of the cutter will produce a strip of material whose length is a common multiple of sole widths in any of a predetermined plurality of sizes.

36. A scale for use in the preparation of cut soles comprising graduations showing combinations of widths of soles of a predetermined size which may be cut from a strip of a given length.

37. A pair of complementary scales for use in the preparation of cut soles from tanned leather backs or bends, one of said scales being designed for use in stripping the back or bend and being provided with indicia indicating a range of sole sizes within which combinations of integral sole widths will aggregate a given length as measured by the scale, and the other scale being designed for use in cutting the resultant strip into soles and having indicia operative to show possible combinations of the integral sole widths indicated as possible by said first scale which can be cut from the strip without substantial waste.

38. Apparatus of the class described, comprising a pair of lantern slides each having thereon in miniature one of a pair of complementary scales for use in the preparation of cut soles from leather, one of said scales being provided with indicia indicating a range of sole sizes within which combinations of integral sole widths will aggregate a given length as measured by the scale, and the other scale having indicia indicating possible combinations of the integral sole widths indicated as possible by said first scale which can be cut from the resultant strip without substantial waste, and means for optically projecting an image of one scale or the other scale, to substantially exact predetermined size, upon the surface of the material prior to each cutting operation.

39. A scale for use in preparing cut soles comprising a fixed datum point, parallel series of spaced numbered graduations denoting size, each such graduation being elongate in the direction of length of the scale, the graduations of adjacent series overlapping each other thereby to indicate a choice of sizes which may be cut in different combinations of width, within the width range denoted by the symbols, without substantial waste.

40. A scale for use in preparing cut soles comprising a fixed datum point, symbols indicating a range of widths and graduations spaced from the datum point and designating sizes, each such graduation being elongate in the direction of the length of the scale and indicating a range of sizes from which combinations of integral widths of sole, within the width range denoted by the symbols, can be cut without substantial waste.

41. A scale for use in preparing cut soles, said scale comprising a fixed datum point and graduations denoting sizes, each such graduation being elongate in the direction of the length of the scale, the length of a graduation denoting permissive variations in the length of a piece of material from which combinations of integral multiples of such widths may be cut.

42. A scale for use in preparing cut soles comprising a fixed datum point and graduations spaced therefrom, each such graduation designating a distance from the fixed datum point which is a multiple of sole widths of a predetermined size or which is a common multiple of sole widths of a plurality of different sizes respectively.

Signed by me at Boston, Massachusetts this 31st day of October, 1931.

THORNDIKE D. HOWE.